US009415299B2

(12) United States Patent
Wikel et al.

(10) Patent No.: US 9,415,299 B2
(45) Date of Patent: Aug. 16, 2016

(54) GAMING DEVICE

(71) Applicant: STEELSERIES ApS, Valby (DK)

(72) Inventors: Harold Wikel, Muskego, WI (US); Kim Rom, Chicago, IL (US); Jeffrey Nicholas Mahlmeister, Chicago, IL (US); Jacob Wolff-Petersen, Richmond (GB); Bruce Hawver, Hawthorn Woods, IL (US); Francis Arnold Grever, Palatine, IL (US); Tino Soelberg, Copenhagen (DK)

(73) Assignee: STEELSERIES ApS, Valby (DK)

( * ) Notice: Subject to any disclaimer, the term of this patent is extended or adjusted under 35 U.S.C. 154(b) by 114 days.

(21) Appl. No.: 13/888,425

(22) Filed: May 7, 2013

(65) Prior Publication Data

US 2014/0335957 A1    Nov. 13, 2014

Related U.S. Application Data

(60) Provisional application No. 61/792,519, filed on Mar. 15, 2013.

(51) Int. Cl.
*A63F 9/24* (2006.01)
*A63F 13/00* (2014.01)
(52) U.S. Cl.
CPC ..................................... *A63F 13/00* (2013.01)
(58) Field of Classification Search
CPC ... A63F 13/06; A63F 11/00; A63F 2300/105; A63F 2300/1025
See application file for complete search history.

(56) References Cited

U.S. PATENT DOCUMENTS

| | | |
|---|---|---|
| 5,207,426 A | 5/1993 | Inoue et al. |
| 5,643,087 A | 7/1997 | Marcus et al. |
| D387,094 S | 12/1997 | Muraki et al. |
| 5,785,317 A | 7/1998 | Sasaki |
| D411,839 S | 7/1999 | Au Yeung |
| 5,923,317 A | 7/1999 | Sayler et al. |
| 6,348,911 B1 | 2/2002 | Rosenberg et al. |
| D487,466 S | 3/2004 | Yokota |
| 6,743,100 B1 | 6/2004 | Neiser |
| 7,002,702 B1 | 2/2006 | Machida |
| D568,883 S | 5/2008 | Ashida et al. |

(Continued)

FOREIGN PATENT DOCUMENTS

| | | |
|---|---|---|
| GB | 2434228 | 7/2007 |
| WO | 2011/130755 | 10/2011 |

OTHER PUBLICATIONS https://www.youtube.com/watch?v=_67L0X79Mlo Nvidia Shield Review.*

(Continued)

*Primary Examiner* — David L Lewis
*Assistant Examiner* — Eric M Thomas
(74) *Attorney, Agent, or Firm* — Guntin & Gust, PLC; Jay Anderson

(57) ABSTRACT

A method that incorporates teachings of the subject disclosure may include, for example, detecting movement of a cover of the device with respect to a body of the device, and determining, in response to detecting movement of the cover, that the device is ready for use. If the device is ready for use, a signal is transmitted to a computing device, and the computing device is directed to perform an initializing procedure for a gaming engine executing on the computing device. Additional embodiments are disclosed.

20 Claims, 19 Drawing Sheets

(56) References Cited

U.S. PATENT DOCUMENTS

| | | | |
|---|---|---|---|
| D570,349 S | 6/2008 | Ashida et al. | |
| 7,383,327 B1 | 6/2008 | Tormasov et al. | |
| D585,931 S | 2/2009 | Palmer | |
| 8,063,893 B2 | 11/2011 | Rosenberg et al. | |
| 8,143,982 B1 * | 3/2012 | Lauder | G06F 1/1626 206/320 |
| 8,212,772 B2 | 7/2012 | Shahoian | |
| 8,264,310 B2 * | 9/2012 | Lauder | G06F 1/1613 206/320 |
| 8,264,465 B2 | 9/2012 | Grant et al. | |
| 8,313,379 B2 | 11/2012 | Ikeda et al. | |
| 8,378,979 B2 | 2/2013 | Frid et al. | |
| 8,418,085 B2 | 4/2013 | Snook et al. | |
| 8,436,821 B1 | 5/2013 | Plichta et al. | |
| D697,140 S | 1/2014 | Baum | |
| 2001/0003713 A1 | 6/2001 | Willner et al. | |
| 2002/0052230 A1 | 5/2002 | Martinek et al. | |
| 2003/0220142 A1 | 11/2003 | Siegel et al. | |
| 2004/0219976 A1 | 11/2004 | Campbell et al. | |
| 2004/0229687 A1 | 11/2004 | Miyamoto et al. | |
| 2004/0261026 A1 | 12/2004 | Corson | |
| 2005/0183143 A1 | 8/2005 | Anderholm et al. | |
| 2006/0148578 A1 | 7/2006 | Hayes et al. | |
| 2006/0211471 A1 | 9/2006 | Walker et al. | |
| 2007/0026935 A1 | 2/2007 | Wolf et al. | |
| 2007/0080934 A1 | 4/2007 | Chen et al. | |
| 2007/0218965 A1 | 9/2007 | Tilston et al. | |
| 2007/0259716 A1 | 11/2007 | Mattice et al. | |
| 2008/0174550 A1 | 7/2008 | Laurila et al. | |
| 2008/0214305 A1 | 9/2008 | Addington et al. | |
| 2008/0225041 A1 | 9/2008 | El Dokor et al. | |
| 2009/0054146 A1 | 2/2009 | Epstein et al. | |
| 2009/0085877 A1 | 4/2009 | Chang et al. | |
| 2009/0124387 A1 | 5/2009 | Perlman et al. | |
| 2009/0163272 A1 | 6/2009 | Baker et al. | |
| 2009/0189858 A1 | 7/2009 | Lev et al. | |
| 2009/0303204 A1 | 12/2009 | Nasiri et al. | |
| 2010/0081505 A1 * | 4/2010 | Alten | A63F 13/02 463/36 |
| 2010/0113153 A1 | 5/2010 | Yen et al. | |
| 2011/0014984 A1 * | 1/2011 | Penman et al. | 463/42 |
| 2011/0021272 A1 | 1/2011 | Grant et al. | |
| 2011/0065509 A1 | 3/2011 | Rom et al. | |
| 2011/0081969 A1 | 4/2011 | Ikeda et al. | |
| 2011/0250967 A1 | 10/2011 | Kulas et al. | |
| 2012/0071244 A1 | 3/2012 | Gillo et al. | |
| 2012/0323521 A1 | 12/2012 | De Foras et al. | |
| 2013/0016042 A1 | 1/2013 | Makinen et al. | |
| 2013/0077820 A1 | 3/2013 | Marais et al. | |
| 2014/0129935 A1 | 5/2014 | Ovadia Nahon et al. | |

OTHER PUBLICATIONS

Microsoft, "Xbox 360 Limited Edition Metallic Silver Wireless Controller", http://www.microsoftstore.com/store/msstore/en_US/pd/ThemeID.27509700/Xbox-360-Limited-Edition-Metallic-Silver-Wireless-Controller/productID.246602800, Mar. 19, 2013.

Sony, "PS3 DualShock 3 Wireless Controller", http://www.gamestop.com/ps3/accessories/ps3-dualshock-3-wireless-controller/69638;, Mar. 19, 2013.

"ControllerMate v4.6", OrderedBytes, 1 page, 2012.

"GestIC Technology Design Center", [http://www.microchip.com/pagehandler/en_us/technology/gestic], Apr. 29, 2013, 1 page.

"GestIC Technology Design Center", [http://www.microchip.com/pagehandler/en-us/technology/gestic/gettingstarted.html], Apr. 29, 2013, 1 page.

"Leap Motion", [https://www.leapmotion.com/], Apr. 29, 2013, 6 pages.

"Near and Far Field", [http://en.wikipedia.org/wiki/Near_and_far_field], Wikipedia, May 2, 2013, 10 pages.

"Siri. Your Wish is its command.", [http://www.apple.com/ios/siri/], Apr. 24, 2013.

* cited by examiner

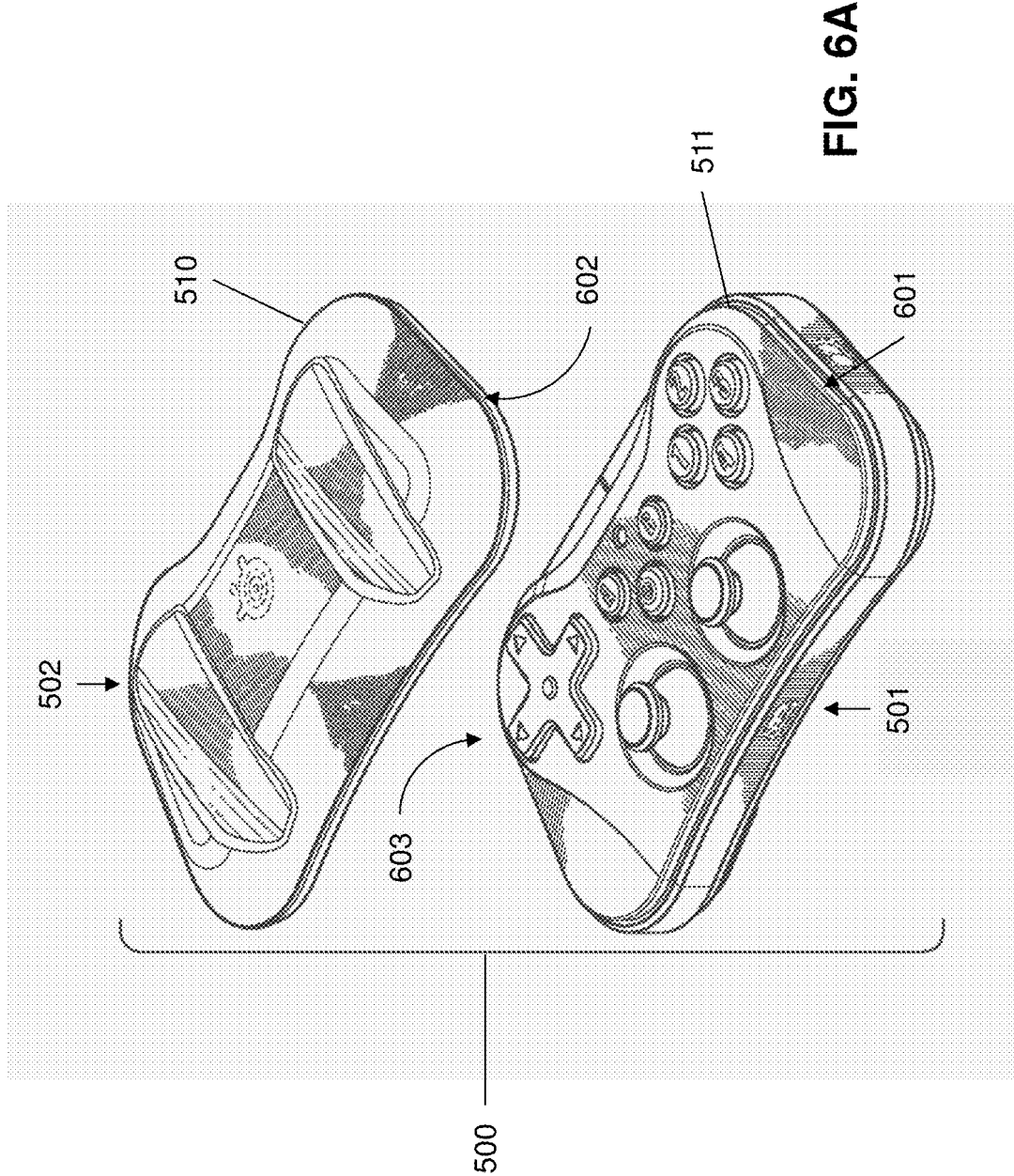

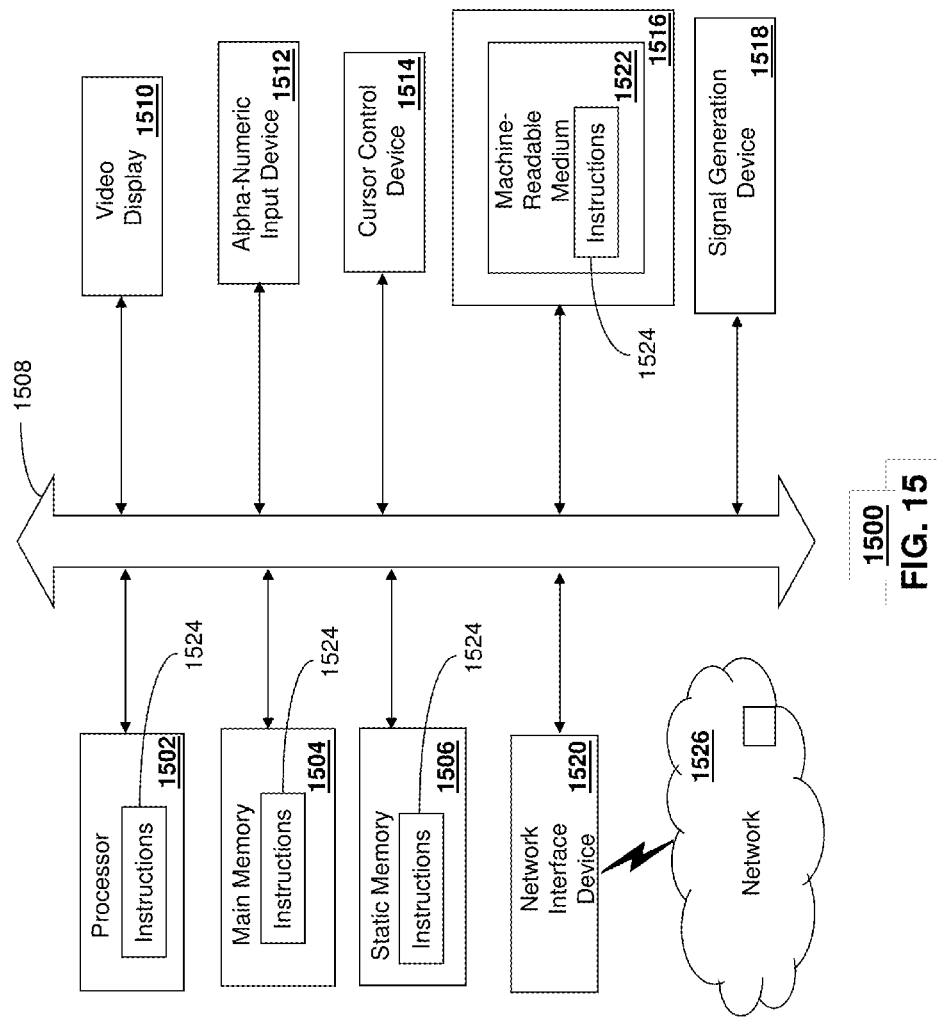

GAMING DEVICE

PRIOR APPLICATION

The present application claims the benefit of priority to U.S. Provisional Application No. 61/792,519 filed Mar. 15, 2013.

FIELD OF THE DISCLOSURE

The subject disclosure relates generally to a device for use by game players.

BACKGROUND

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories.

A gamer can frequently use a combination of these accessories during a game. Efficient management and utilization of these accessories can frequently impact a gamer's ability to compete.

BRIEF DESCRIPTION OF THE DRAWINGS

Reference will now be made to the accompanying drawings, which are not necessarily drawn to scale, and wherein:

FIG. 6A is a perspective view of a gaming device including a removable cover, in accordance with an embodiment of the disclosure;

FIG. 15 depicts an illustrative diagrammatic representation of a machine in the form of a computer system within which a set of instructions, when executed, may cause the machine to perform any one or more of the methodologies disclosed herein.

DETAILED DESCRIPTION

The subject disclosure describes, among other things, illustrative embodiments of a gaming device. Other embodiments are contemplated by the subject disclosure.

One embodiment of the subject disclosure can entail a device comprising a memory to store instructions and a controller coupled to the memory. Responsive to executing the instructions, the controller performs operations comprising detecting a cover of the device with respect to a body of the device, and determining, in response to detecting movement of the cover from a first position proximate to a top side of the body, that the device is ready for use. In accordance with determining that the device is ready for use the controller performs further operations comprising transmitting a signal to a computing device that the device is ready for use, directing the computing device to perform an initializing procedure for a gaming engine executing on the computing device wherein the initializing procedure comprises determining initial settings, and directing the computing device to perform a search procedure wherein the search procedure comprises querying availability of another device for playing a game.

One embodiment of the subject disclosure can entail a computer-readable storage device comprising instructions, which when executed by a processor, cause the processor to perform operations comprising detecting a cover of the device with respect to a body of the device, determining, in response to detecting movement of the cover from a first position proximate to a top side of the body, that the device is ready for use, and in accordance with determining that the device is ready for use, performing further operations comprising transmitting a signal to a computing device that the device is ready for use and directing the computing device to perform an initializing procedure for a gaming engine executing on the computing device, wherein the initializing procedure comprises determining initial settings.

One embodiment of the subject disclosure can entail a method comprising detecting movement of a cover of the device with respect to a body of the device, and determining, in response to detecting movement of the cover, that the device is ready for use. If the device is ready for use, a signal is transmitted to a computing device, and the computing device is directed to perform an initializing procedure for a gaming engine executing on the computing device. The computing device is also directed to perform a search procedure, wherein the search procedure comprises querying availability of another device for playing a game.

Figure 1:
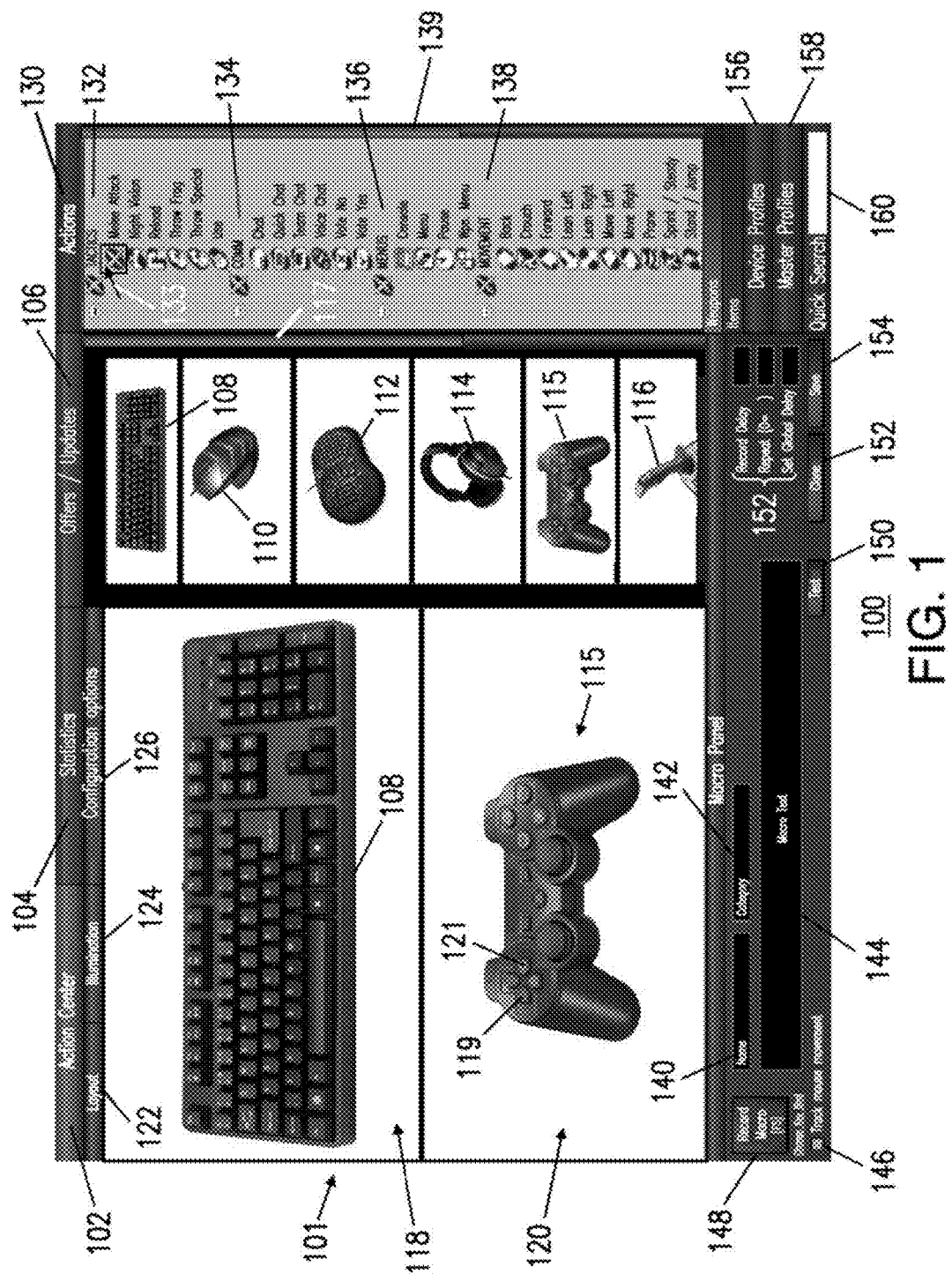
FIG. 1 depicts an illustrative embodiment of a Graphical User Interface (GUI) generated by an Accessory Management Software (AMS) application according to the subject disclosure.

FIG. 1 depicts an illustrative embodiment 100 of a Graphical User Interface (GUI) 101 generated by an Accessory Management Software (AMS) application according to the subject disclosure. The gamer can interact with one or more of the gaming accessories via the GUI. The AMS application can be executed by a computing device such as a desktop computer, a laptop computer, a server, a mainframe computer, a gaming console, a gaming accessory, or combinations or combinations of portions thereof. The AMS application can also be executed by portable computing devices (with computing resources) such as a cellular phone, a smartphone, a personal digital assistant, a tablet, or a media player (such as an iPOD™). It is contemplated that the AMS application can be executed by any device with suitable computing resources.

Figure 2A:
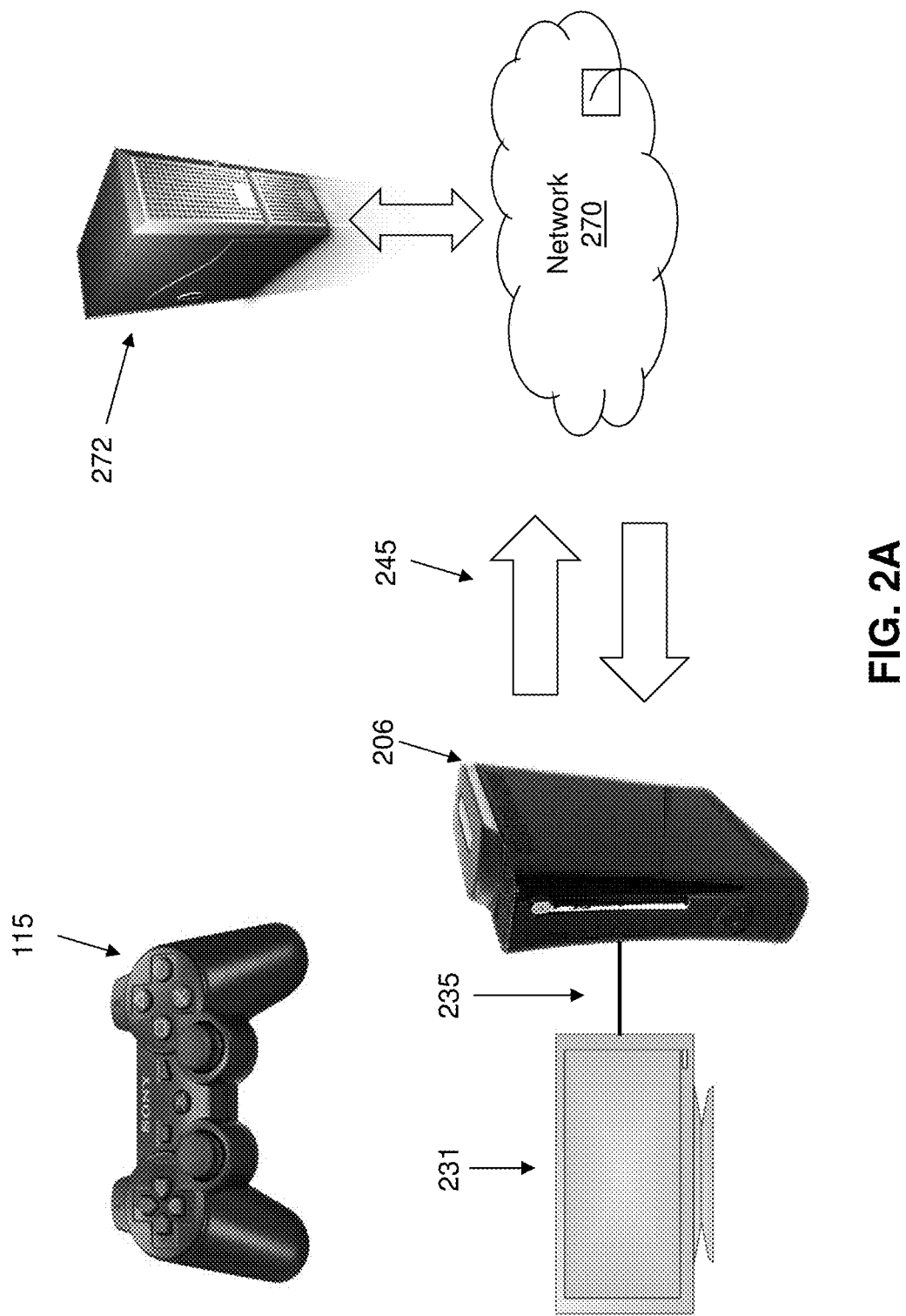
FIGS. 2A and 2B depict illustrative embodiments for communicatively coupling a gaming controller to a computing device via a network.

FIG. 2A schematically depicts a gaming controller 115 which can be used by a gamer, according to an embodiment of the subject disclosure. In this embodiment, gaming controller 115 and gaming console 206 have an integrated wireless interface for wireless communications therebetween (e.g., WiFi, Bluetooth, ZigBee, or a proprietary protocol). The gaming console 206 can also be coupled to network 270 via communication link 245, such as a WiFi link, to the internet. The gaming console 206 can be, for example, an Xbox™, a PS3™, a Wii™, or another suitable gaming console device. Video information is displayed to the gamer on display device 231, which in this illustration is coupled to gaming console 206 by a wired connection 235, but can be replaced, if desirable, by a wireless interface (e.g., wireless HDMI. Display device 231 may be a television as illustrated or a touch screen comprising both an input device and an output device. Alternatively, the gaming controller 115 can be tethered to a computing device such as the gaming console by a cable (e.g., USB cable) to provide a means of communication less susceptible to electromagnetic interference or other sources of wireless interference.

Figure 2B:
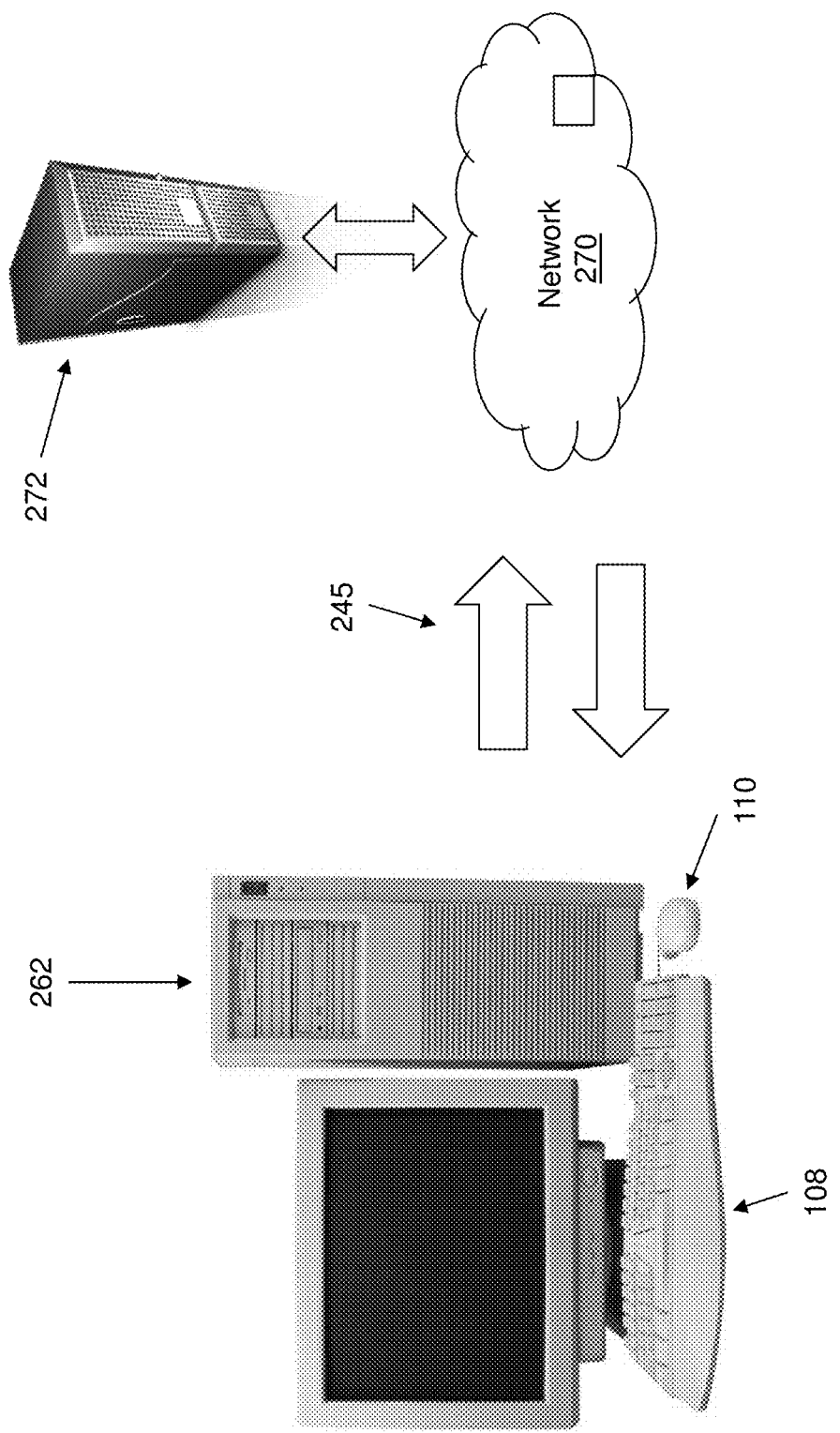

FIG. 2B depicts an alternative embodiment to FIG. 1A in which a desktop computer 262 is used in place of the gaming console 206. In one embodiment, the desktop computer 262 can be configured to execute a gaming client (i.e., a software application) acting in cooperation with an on-line gaming server 272 accessible by the desktop computer 262 via the network 270 (e.g., World of Warcraft™). In another embodiment, the desktop computer 262 can be configured to execute a localized gaming software application without accessing the on-line gaming server 272.

The gaming accessory used with the desktop computer 262 can be a keyboard 108, mouse 110, or another suitable gaming accessory device. In the present context, an accessory can represent any type of device which can be communicatively coupled to the computing device (or an integral part of the computing device) and which can control aspects of an operating system (OS) and/or a software application operating in the computing device. An accessory can represent for example a keyboard, a touch screen display, a gaming pad, a gaming controller, a mouse, a joystick, a microphone, or a headset with a microphone—just to mention a few.

It is understood that the devices shown in FIGS. 1, 2A and 2B are mere illustrations of possible gaming configurations. The subject disclosure is applicable to other gaming configurations and is thereby not limited by those described in FIGS. 1, 2A and 2B.

Figure 3:
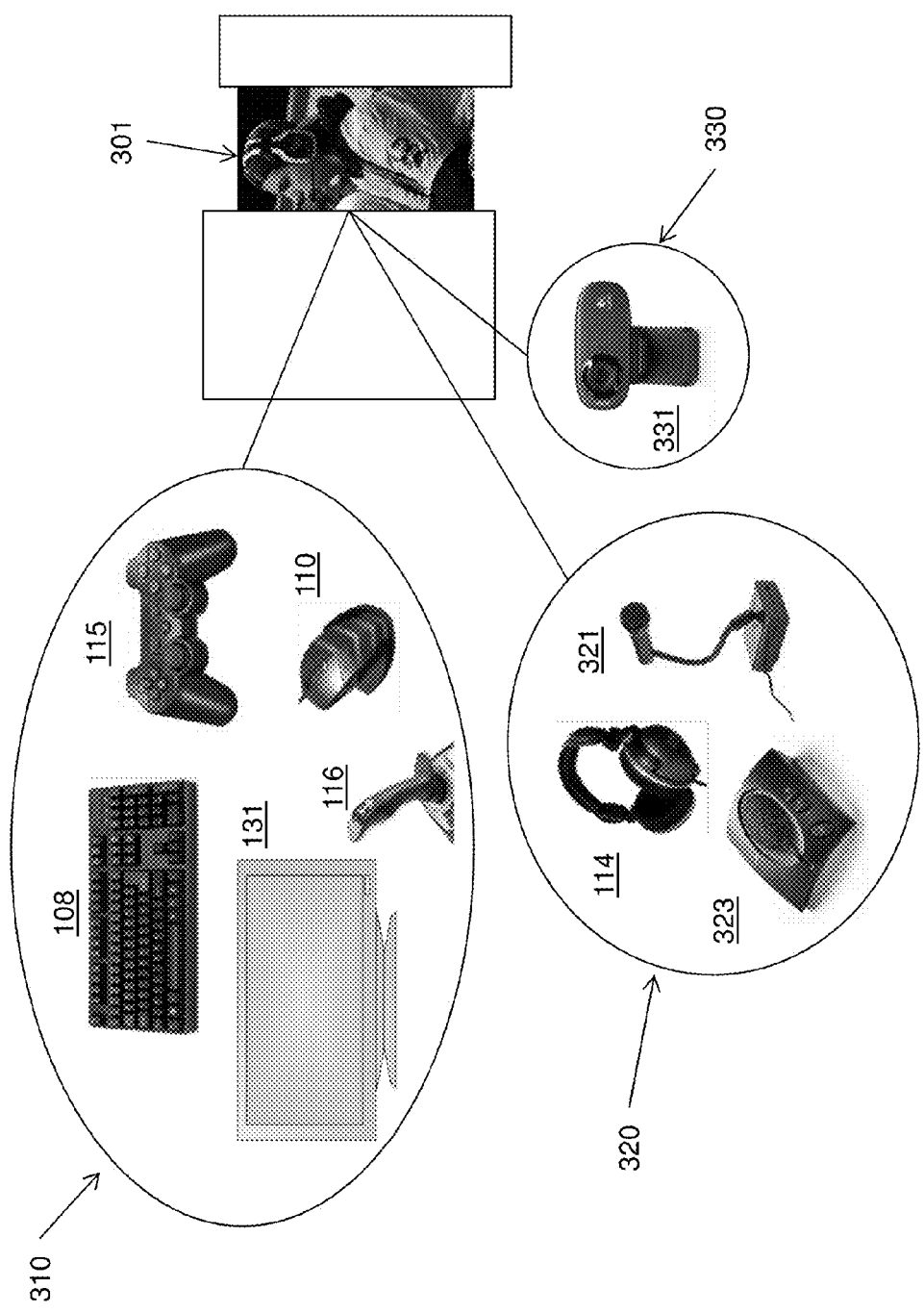
FIG. 3 schematically illustrates gaming accessories that can be used by a gamer interacting with a gaming engine.

FIG. 3 illustrates gaming accessory devices with which a gamer 301 can interact. Touch-sensitive devices 310 can include a gaming controller 115, mouse 110, keyboard 108, touchscreen display 231, and joystick 116. Audio devices 320 can include headphones 114, microphone 321, and speakerphone 323. Imaging devices 330 can include webcam 331. These accessory devices can provide tactile, audio, and/or visual stimuli to a gamer, receive responses from the gamer to thereby generate stimuli which can be interpreted by a gaming software application, or both.

The accessories can be coupled to the computing device by a tethered interface (e.g., USB cable), a wireless interface (e.g., Bluetooth or Wireless Fidelity—WiFi), or combinations thereof.

The term "gaming system," as used herein, refers to the combination of computing hardware and software that delivers a gaming experience. The software applications that present and manage the gaming experience are collectively referred to herein as a "gaming engine." The gaming engine generally includes the AMS for managing and augmenting usage of the various accessories, and an Application Program Interface (API) for receiving feedback from a computing device which is a subset of the gaming system that executes a gaming software application. The computing device can be a gaming console, a server, a local computer, a portable communication device, combinations thereof, or other devices with suitable processing resources.

Figure 4:
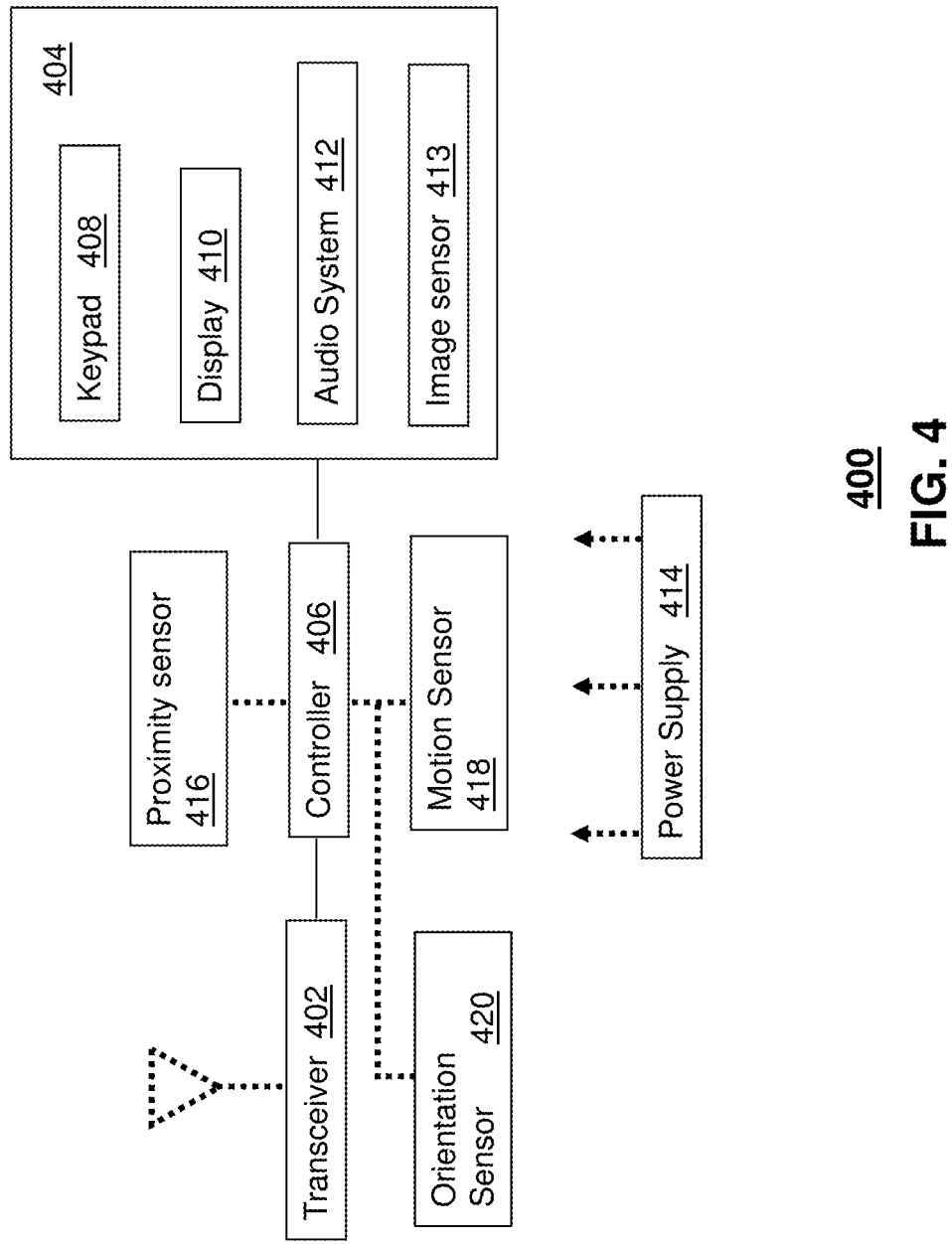
FIG. 4 depicts an illustrative embodiment of a communication device.

FIG. 4 depicts an illustrative embodiment of a computing device 400. Computing device 400 can serve in whole or in part as an illustrative embodiment of the devices depicted in FIGS. 1-3. The computing device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as proprietary or other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the computing device 400. The keypad 408 can be an integral part of a housing assembly of the computing device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the computing device 400. In an embodiment where the display 410 is touch-sensitive, a portion or all of the keypad 408 can be presented by way of the display 410 with navigation features (e.g., an iPad™, iPhone™, or Android™ phone or tablet). As a touch screen display, the computing device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the computing device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as a electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the computing device 400 in three-dimensional space. The orientation sensor 420 can utilize orientation sensing technology such as a magnetometer to detect the orientation of the computing device 400 (North, South, West, East, combined orientations thereof in degrees, minutes, or other suitable orientation metrics).

The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the computing device 400 can include a reset button (not shown). The reset button can be used to reset the controller 406 of the computing device 400. In yet another embodiment, the computing device 400 can also include a factory default setting button positioned below a small hole in a housing assembly of the computing device 400 to force the computing device 400 to re-establish factory settings. In this embodiment, a user can use a protruding object such as a pen or paper clip tip to reach into the hole and depress the default setting button.

The computing device 400 as described herein can operate with more or fewer components described in FIG. 4 to accommodate the implementation of the devices described by the subject disclosure. These variant embodiments are contemplated by the subject disclosure.

Figure 5A:
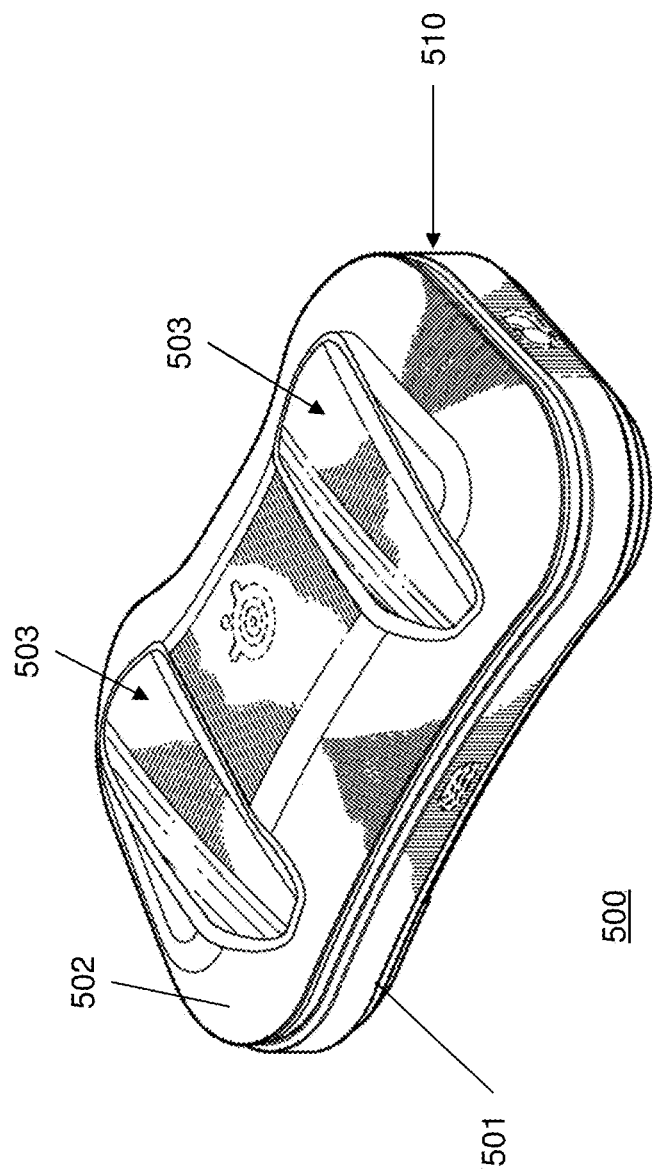
FIGS. 5A and 5B are a top perspective view and an end view, respectively, of a gaming device in accordance with embodiments of the disclosure.
Figure 5B:
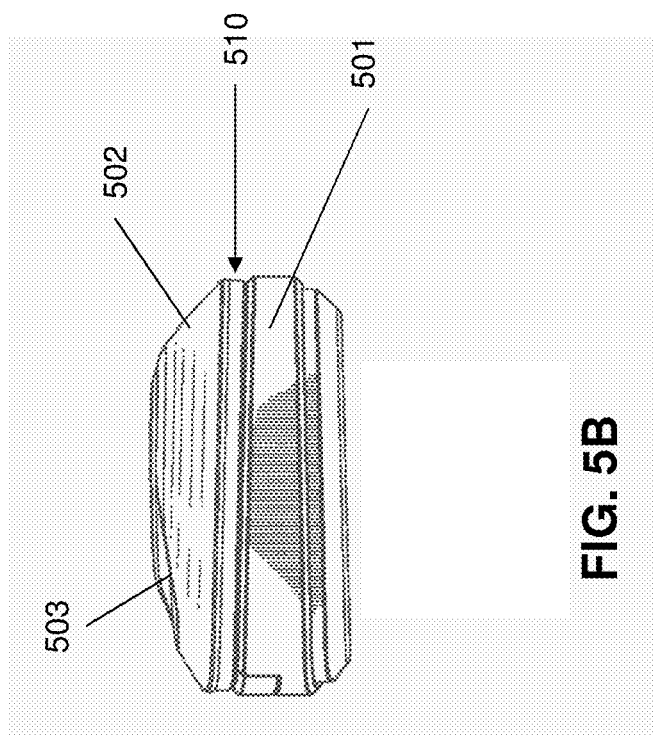

FIGS. 5A and 5B illustrate, in accordance with an embodiment, an arrangement 500 of a gaming accessory used to invoke the AMS application in a computing device. In this embodiment, the accessory has a main body 501 and a cover 502 that fits over the top surface of the main body when the accessory is not in use. Cover 502 includes features (e.g., depressions or other gripping structures) 503 to accommodate a user's fingers and thus provide a convenient grip when the accessory is in use, as explained in more detail below. Cover 502 has an edge portion 510 that can make a sliding contact, a friction fit, or a press fit with a corresponding top outer edge of main body 501. The computing device can be a remote server (not shown), the gaming console 206 of FIG. 2A, or any other computing device with suitable computing resources. The accessory can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device) and which can control aspects of the operating system (OS) and/or a software application operating in the computing device. An accessory can represent for example a keyboard, a touch screen display, a gaming pad, a gaming controller, a mouse, a joystick, a microphone, or a headset with a microphone—just to mention a few.

FIG. 6A illustrates accessory 500 with cover 502 removed from the top of main body 501. Control devices 603 used in playing a game can be disposed on the top side of main body 501. In this embodiment, top edge portion 511 of main body 501 includes an outward-facing electrical contact 601 while edge portion 510 of cover 502 has an inward-facing electrical contact 602 (not shown in FIG. 6A). Contacts 601-602 together form a switch. When cover 502 is fitted over the top of main body 501 (that is, the cover is closed), contact is made between 601 and 602 so that the switch is closed. Closure of the switch can cause the electronic devices or components in the accessory to be powered off, and can also cause a signal to be sent to the computing device that the accessory is in an OFF state. Alternatively, edge portion 511 can include a tab or plunger that is displaced when cover 502 is fitted onto body 501 and edge portion 510 comes into contact with edge portion 511. The displacement can actuate a switch inside body 501, causing the electronic devices or components in the accessory to be powered off, and causing a signal to be sent to the computing device that the accessory is in an OFF state. Removal of the cover actuates the switch—that is, causes a change of state of the switch (breaking contact, release of a plunger, etc.) indicating that the accessory is no longer in the OFF state.

Figure 6B:
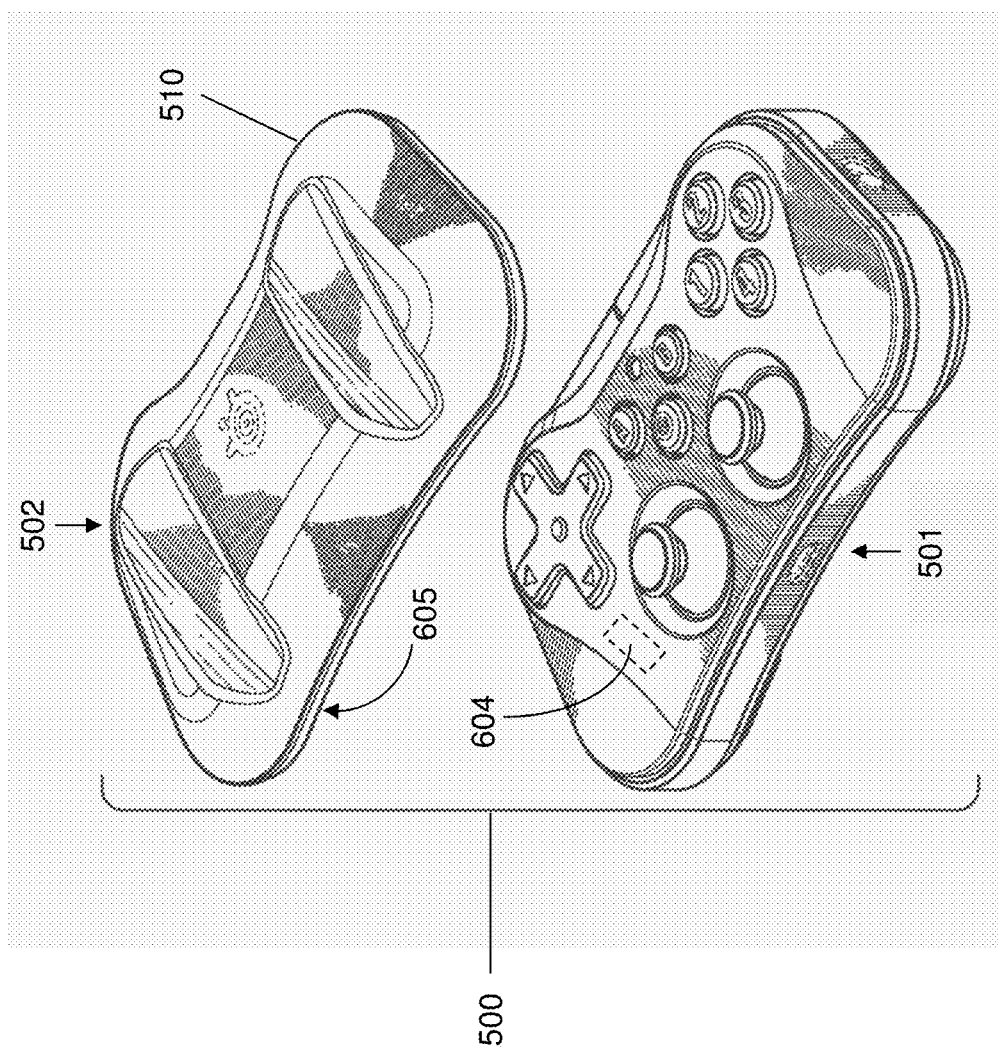
FIG. 6B is a perspective view of a gaming device including a removable cover, in accordance with another embodiment of the disclosure.

FIG. 6B schematically illustrates an alternative arrangement in which the accessory main body has a proximity sensor 604 and a sensor target 605 (not shown in FIG. 6B), mounted on the underside of the cover or encapsulated in the cover 502. The sensor and sensor target together can form a capacitive or magnetic switch. As in FIG. 6A, when cover 502 is fitted over the top of main body 501 (that is, the cover is closed), sensor 604 determines proximity of target 605 so that the switch is closed. Closure of the switch can cause the electronic devices in the accessory to be powered off, and can also cause a signal to be sent to the computing device that the accessory is in an OFF state. If the cover is removed from the main body, sensor 604 detects that target 605 is no longer proximate to the main body, so that control devices 603 are exposed and the accessory is ready for use.

Figure 6C:
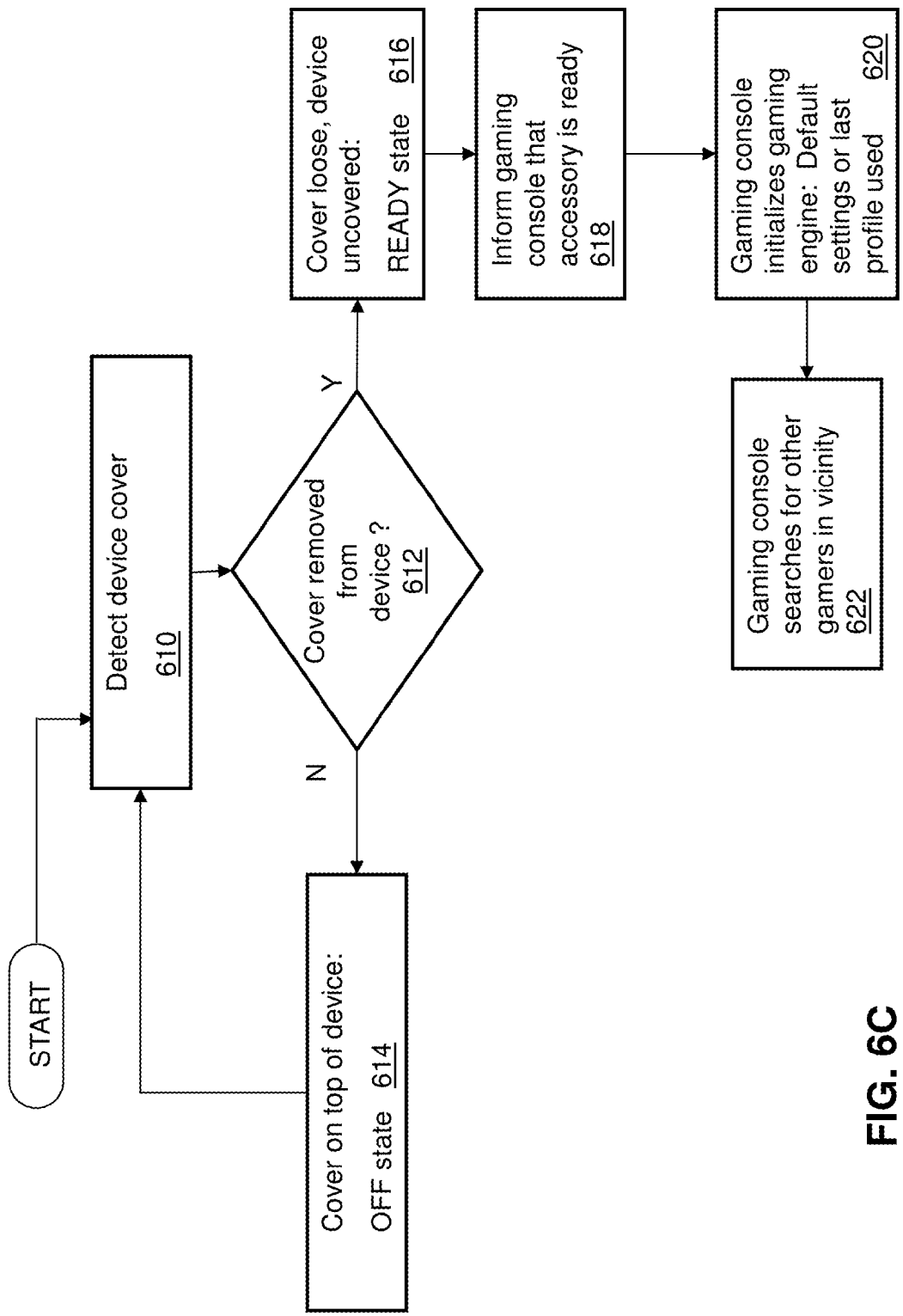
FIG. 6C is a flowchart of a procedure in which control functions are invoked by removing the cover of the gaming device as shown in FIGS. 6A and 6B.

FIG. 6C shows steps in a procedure for using the accessory cover to control functions of the accessory, according to an embodiment. In step 610, the accessory detects the cover, using a contact switch or proximity sensor as shown in FIGS. 6A and 6B. Depending on the state of the switch or sensor (step 612), the cover is determined to be on top of the accessory as shown in FIGS. 5A and 5B so that the accessory is in an OFF state (step 614), or removed from the accessory as shown in FIGS. 6A and 6B (step 616). If removal of the cover is detected, the accessory enters a READY state (that is, the accessory and gaming engine interpret removal of the cover as an indication that the gamer wishes to invoke the AMS application). The accessory transmits a signal to the gaming console that the accessory is ready (step 618). In response to this signal, the gaming console initializes the gaming engine (step 620), either with default settings or according to the last profile used by the gamer. The gaming console then searches for other gamers who may be in the vicinity and wish to join the game (step 622).

Figure 7A:
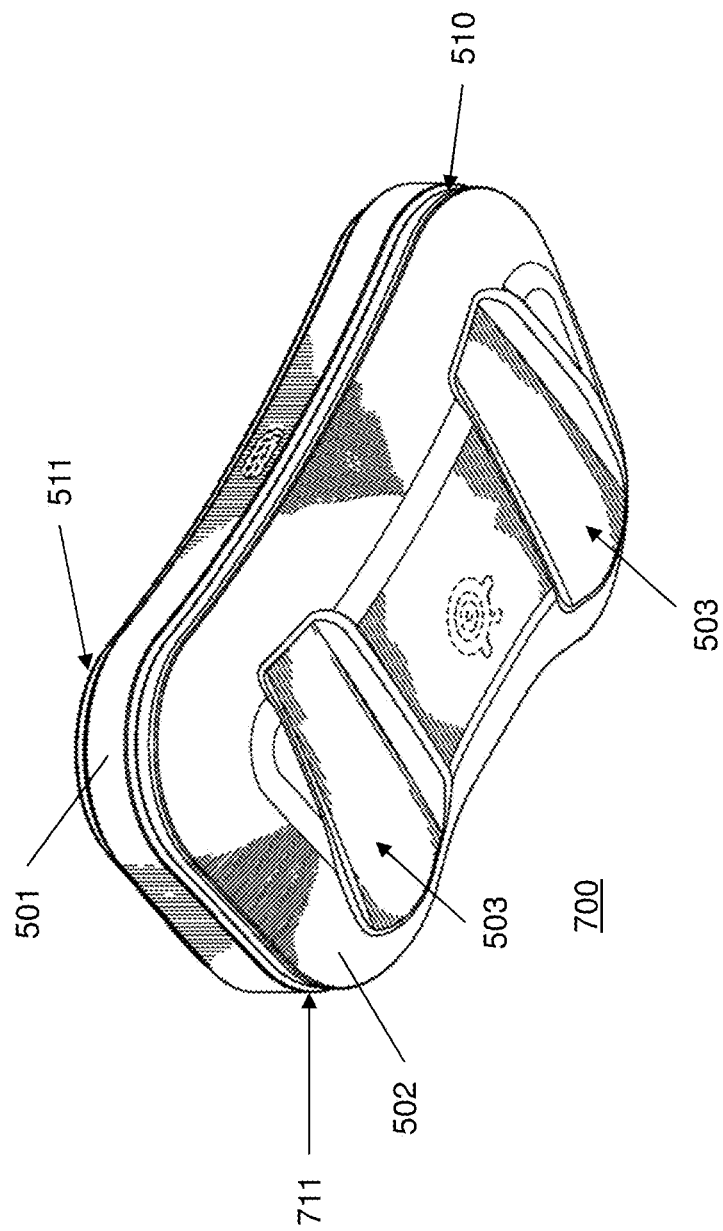
FIGS. 7A and 7B are a bottom perspective view and an end view, respectively, of a gaming device in accordance with a further embodiment of the disclosure.
Figure 7B:
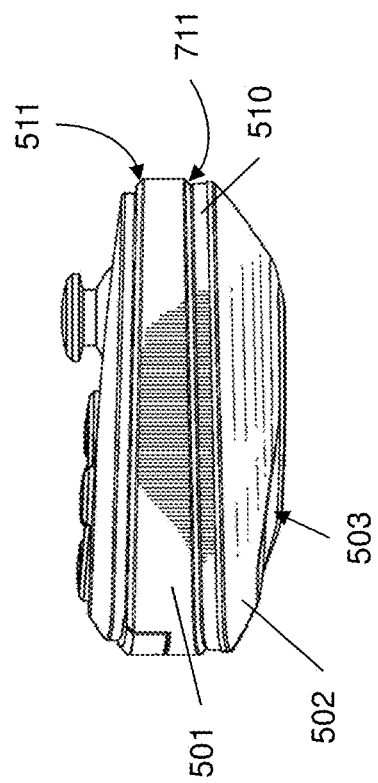

FIG. 7A illustrates an accessory arrangement 700 according to another embodiment, in which cover 502 is removed from the top of accessory main body 501 and placed on the bottom of main body 501 when the accessory is in use. As shown in FIG. 7A, edge portion 510 of cover 502 is placed in contact with bottom edge portion 711 of main body 501. The bottom edge portion 711 can include an electrical contact to form a switch with electrical contact 602 of the cover (see FIG. 6A). Alternatively, a proximity sensor can be mounted on the underside of main body 501 (or in the interior of main body 501 close to the underside) to form a capacitive or magnetic switch with the sensor target 605 of the cover (see FIG. 6B). In this embodiment, cover 502 can be in one of three states with respect to main body 501: covering the top (OFF state), covering the bottom (READY state), or loose (which may be viewed as a STANDBY state). As shown in FIGS. 7A and 7B, in this embodiment cover 502 is shaped (e.g. with depressions 503) to provide a grip for the gamer while the top of the accessory is exposed and the accessory is in use.

Figure 7C:
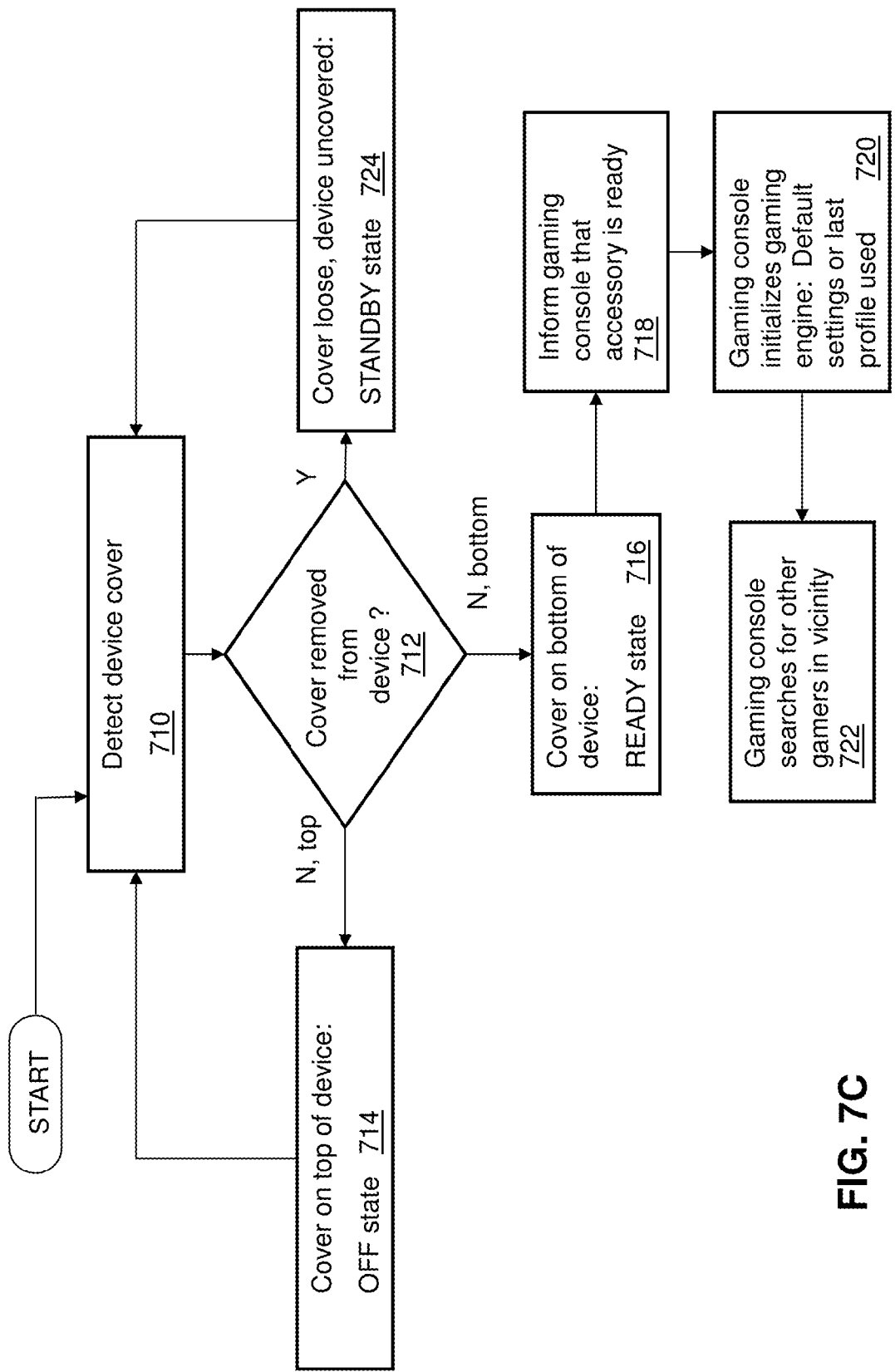
FIG. 7C is a flowchart of a procedure in which control functions are invoked by removing the cover of the gaming device from the top of the device and placing the cover on the bottom of the device as shown in FIGS. 7A and 7B.

FIG. 7C shows steps in a procedure for using the accessory cover to control functions of the accessory, according to an embodiment. In step 710, the accessory detects the cover, using contact switches or proximity sensors as described above. Depending on the state of the switches or sensors (step 712), the cover is determined to be on top of the accessory corresponding to an OFF state (step 714), removed from the accessory which can be interpreted as a STANDBY state (step 724), or in place on the bottom of the accessory (step 716). If the cover is detected on the bottom of the accessory, the accessory enters a READY state (that is, the accessory and gaming engine interpret placement of the cover on the bottom as a signal that the gamer wishes to invoke the AMS application). The accessory transmits a signal to the gaming console that the accessory is ready (step 718). In response to this signal, the gaming console initializes the gaming engine (step 720), either with default settings or according to the last profile used by the gamer. The gaming console then searches for other gamers who may be in the vicinity and wish to join the game (step 722).

In a further embodiment, the accessory main body can be provided with a plurality of interchangeable covers (each providing a switch/sensor function to control the accessory, as discussed above) with different materials or shapes, thereby providing the gamer with a variety of different grips.

Figure 8:
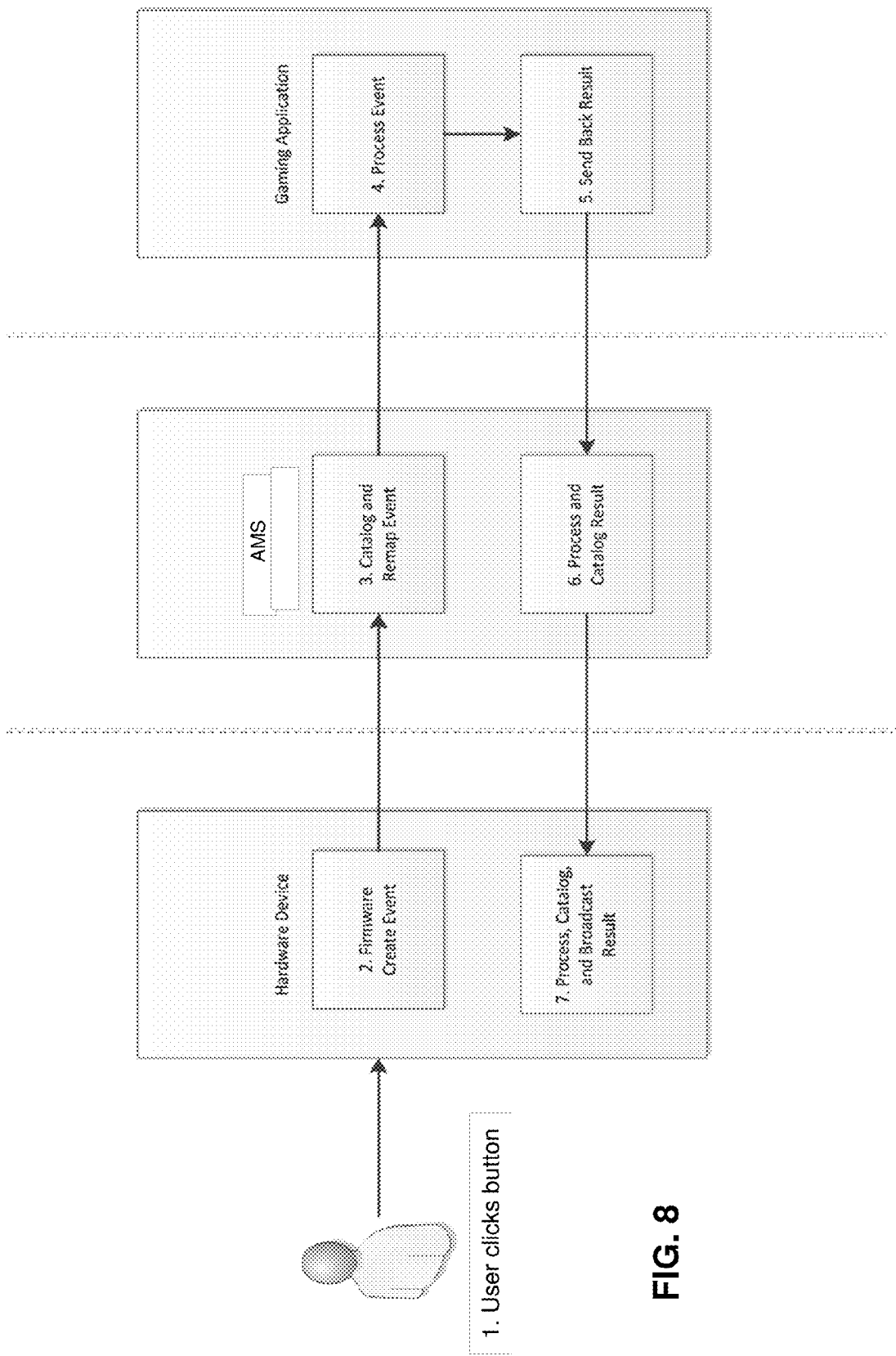
FIG. 8 depicts an illustrative embodiment of a system operating at least in part with a gaming device according to FIGS. 5A, 5B, 6A-6C, and 7A-7C.
Figure 9:
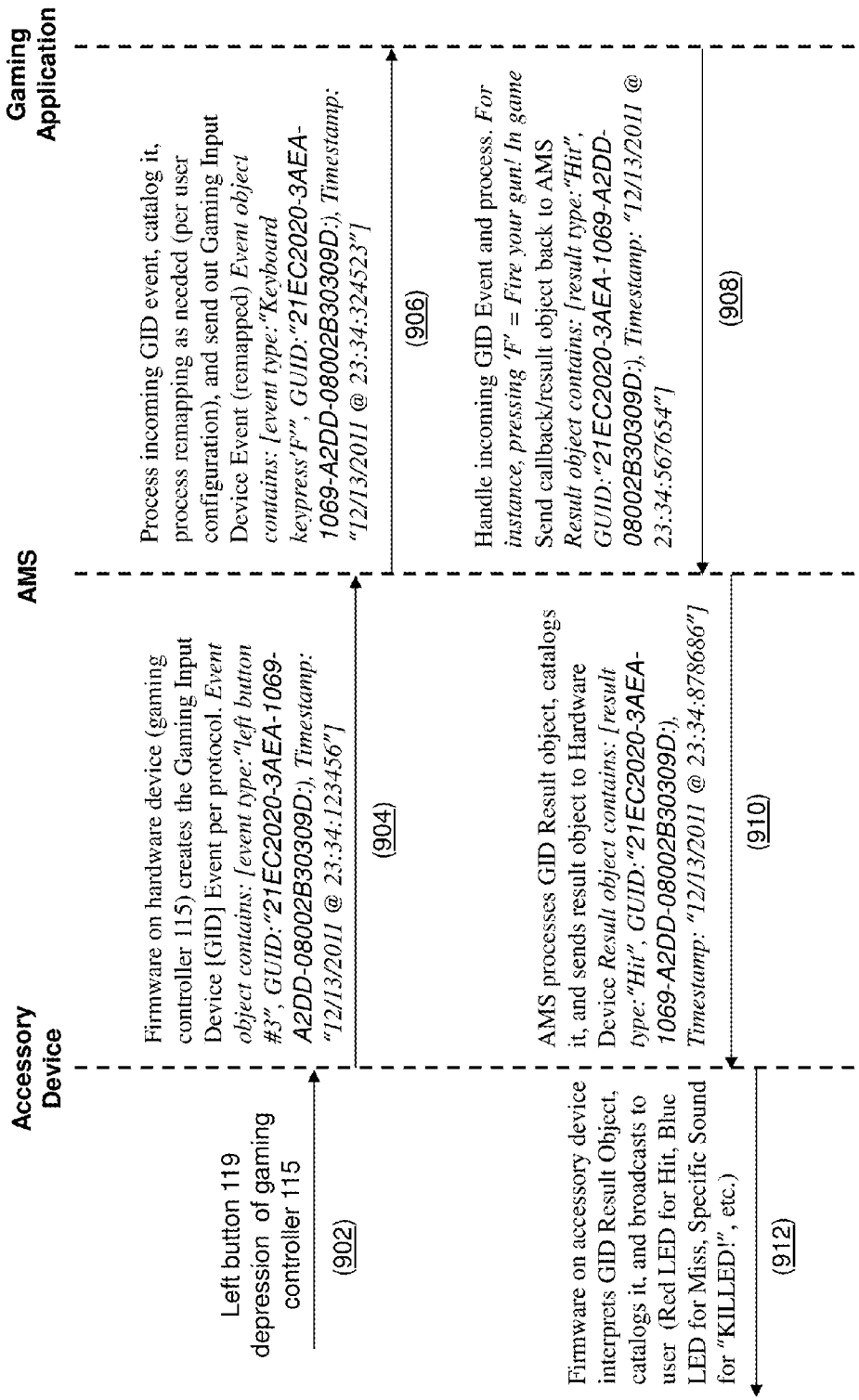
FIG. 9 depicts an illustrative embodiment of a communication flow diagram utilized by a gaming system including a gaming device according to embodiments of the disclosure.

FIGS. 8-9 illustrate embodiments of a system with a corresponding communication flow diagram for correlating stimulations and gaming action results.

In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming applica-tion as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

The AMS application can catalogue results as shown in FIGS. 11-14. The presentation of the catalogued results can be based on a live session, or a replay session when reviewing segments of a video game much like a replay session of a sporting event (e.g., football game) is analyzed by sports analysts. To assist the audience in viewing a competition between gamers, the AMS application can be adapted to present a virtual peripheral representative of the accessory of each gamer as shown in FIGS. 11-14.

Figure 10:
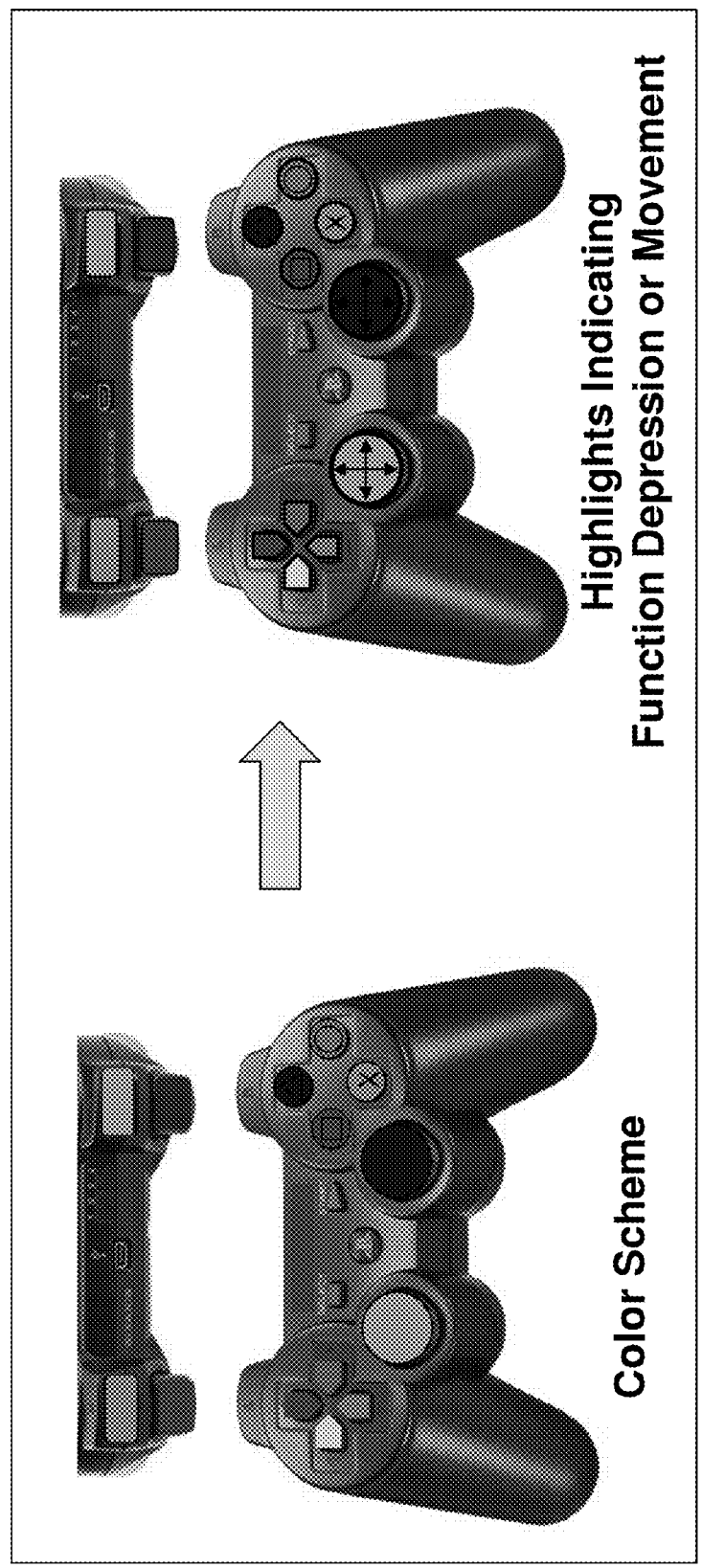
FIG. 10 depicts an illustrative embodiment for highlighting functions of a gaming accessory.

The AMS application can be adapted to use coloring and highlight schemes to indicate when a function (e.g., a button or navigation knob) of the peripheral is being used as shown in FIG. 10. For example, the color code "dark red" can represent a button or knob that is frequently in use, while a color code of "dark blue" can represent a button or knob that is infrequently used. To indicate when a button or knob is in use, the button or knob can be highlighted with a white outline while the unused buttons can remain unhighlighted. In the case of knobs, which can be moved omnidirectionally, the AMS application can show movements of a highlighted knob as the gamer is utilizing the knob based on the stimulations received by the AMS application.

For example, if a gamer moves a knob in a northwest direction, the knob is highlighted with a white outline, and the knob is shown moving in the direction chosen by the gamer. As buttons are being depressed and released rapidly, the AMS application will present rapid transitioning between the enabling and disabling of highlights to indicate the speed that the gamer is depressing and releasing the buttons. As the frequency of depressions of buttons or use of knobs increases, the AMS application will change the color code of the buttons or knobs as described above to signify frequency of use of the buttons and knobs.

In an embodiment where the AMS application receives gaming results from a gaming application via an API as described above, the communication flow diagram shown in FIG. 9 can be modified with a more comprehensive protocol that includes a weapon type being monitored, misses, non-kill hits (i.e., a hit that does not result in a kill), kill hits, and loss of life rate.

Figure 11:
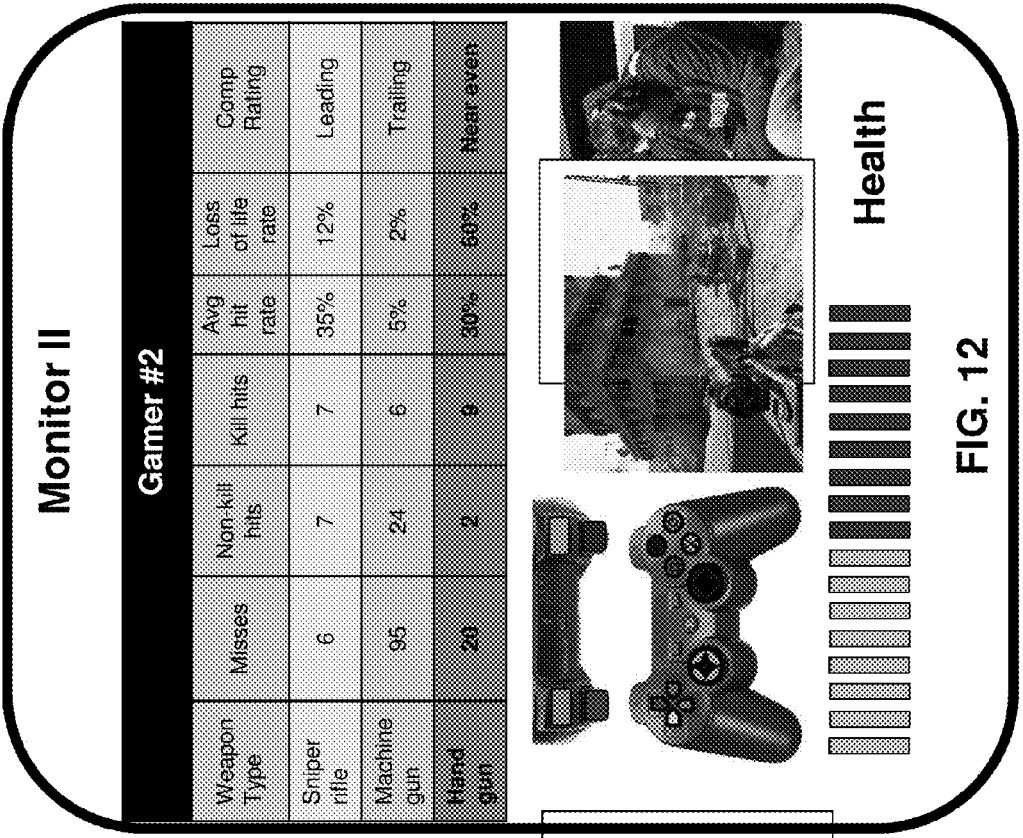
FIGS. 11-14 depict illustrative embodiments for presenting performances of gamers.
Figure 12:
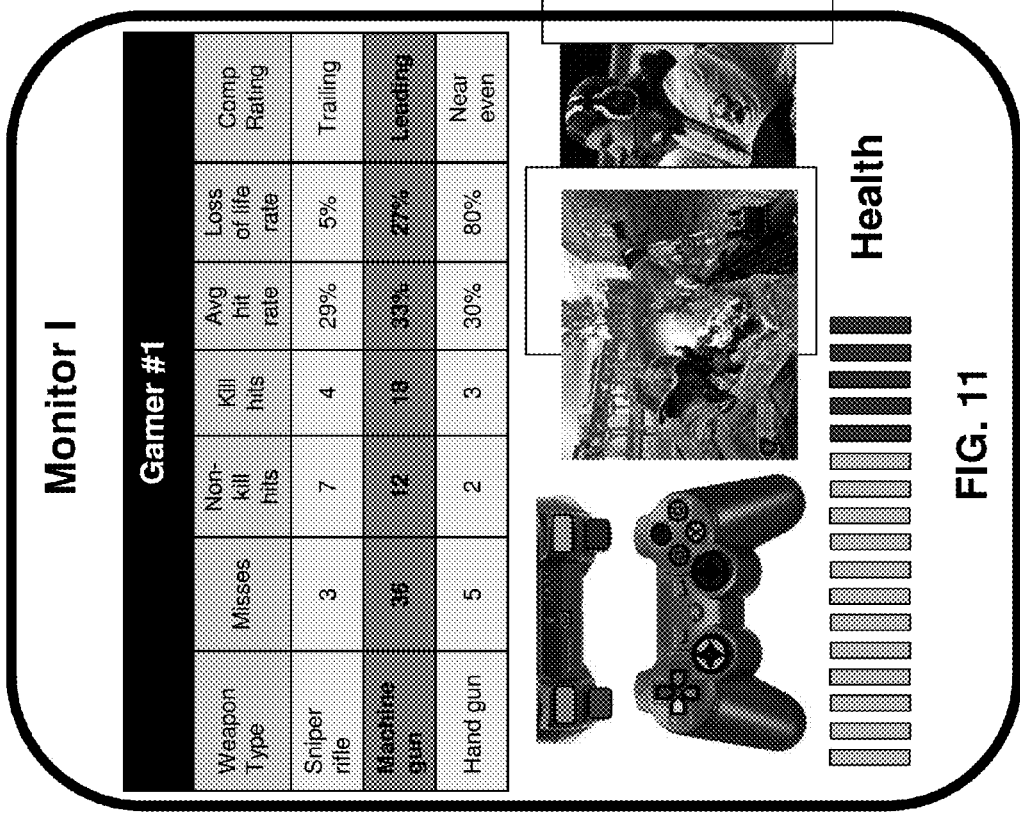

The AMS application can present performance factors of each gamer, and the type of weapons being tracked (e.g., sniper rifle, machine gun, hand gun) as shown in FIGS. 11-12. To identify which weapon is being used at any point in time during a gaming session, the AMS application can highlight the weapon in a distinguishable color such as blue while keeping all other weapon rows in gray. The AMS application can calculate an average hit rate from the misses, non-kill hits, and kill hits. The AMS application can compare gaming action results between the gamers to identifying leading performance factors as shown in the "Comp Rating" column of each player. In a tournament setting, the performance factors shown in FIGS. 11 and 12 can be shown in side-by-side monitors, or together in a JumboTron™ display such as those used in sporting events or the like.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115. To further enhance the experience for the audience, the gamer's image can be shown as a video clip during the competition. The AMS application can also be adapted to present a portion of the video game associated with each gamer as shown in FIGS. 11-12.

Figure 13:
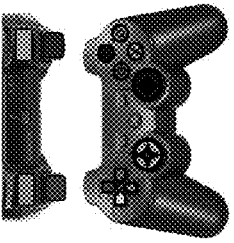
Figure 14:
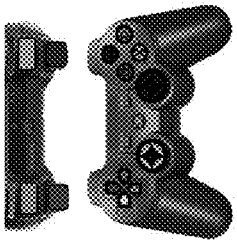

In an embodiment where the gaming application does not provide gaming action results (e.g., the video gaming application does not provide an API), the AMS application can be adapted to present a gamer's performance based on the stimulus signals generated, and where applicable, the substitute stimulus signals submitted to the gaming application as shown in FIGS. 13-14. In this illustration, the virtual peripherals are shown with the color scheme and highlights discussed earlier. The performance of the gamers can be presented according to the type of weapons used, the key depressions invoking substitutions, the macros invoked, and the rate of transmission of stimuli to the gaming application.

For example, for gamer #1, the simultaneous depression of the up and down arrows invoked the macro team chat, while using the sniper rifle. The gamer shot the rifle 14 times with 4 shots in rapid succession. Upon depressing the left "1" button of a front section of the gaming controller 115 of gamer #1, the AMS application invoked substitute stimuli transmitted to the gaming application which switches the use of the sniper rifle to the machine gun. A subsequent depression of the same button can cause a substitute stimuli generated by the AMS application to return to the sniper rifle. A depression of the right "1" button by gamer #1 resulted in substitute stimuli generated by the AMS application to call for air support. Gamer #2 shows that s/he has not invoked a substitute stimuli for the machine gun. This may be because the gamer has not pre-programmed the AMS application to associate stimuli generated by the gaming controller 115 with substitute stimuli, or because the gamer has chosen not to invoke substitute stimuli with a particular key depression (or sequence of key depressions).

Although not shown, monitoring stimuli generation and substitutes can be used to rate players' performances. For example, a gamer that has a tendency to perform rapid fire on a machine gun without saving ammunition may be viewed as a poor game tactic. Comparing such statistics between gamers can be used to show performance lead factors between the gamers.

From the foregoing descriptions, it would be evident to an artisan with ordinary skill in the art that the aforementioned embodiments can be modified, reduced, or enhanced without departing from the scope and spirit of the claims described below.

For instance, the AMS application can record stimulus signals and/or gaming results for a game session and store this data for an extended period of time for each of a plurality of gamers. In addition, the AMS application can store multiple recorded game sessions for each gamer and can be adapted to compare a history of game sessions to assess how each gamer's performance has evolved. Each gamer's improvement or degradation detected by the AMS application over a number of gaming sessions can be reported to the gamer and/or other gamers as progression line charts, histograms, pie charts or other suitable presentation methods. The results can also be reported in a gaming tournament, on-line games, or other suitable setting in a manner similar to the illustrations of FIGS. 11-14.

The AMS application can compare a gamer's performance in a particular game to a gaming session recorded from a prior tournament for the same game or another game. Performance in the present context can mean a comparison of only stimulus signals (e.g., accessory-generated stimulus signals and/or substitute stimulus signals). This embodiment may be user-selectable (i.e., user selects stimulus analysis only) by way of a GUI presented by the AMS application, or the AMS application may apply this embodiment automatically in instances where the AMS application does not receive gaming action results from the gaming application due to a lack of an API or other suitable interface to receive gaming action results from the gaming application. Performance can also mean a comparison of only gaming action results and not stimulus signals, which can also be a user-selectable feature presented by a GUI generated by the AMS application. Performance can further represent a combination of gaming action results and stimulus signals with similar data of other recorded gaming sessions. In sum, a gamer's performance can be determined from stimulus signals (with or without substitute stimulus signals), and/or gaming action results in whole or on part monitored by the AMS application.

For any one of the foregoing embodiments, the AMS application can detect improvements or degradations in performance between a present tournament game and the previously recorded tournament game and report the results to the gamer and/or an audience of on-line gamers or a public audience at a tournament via the monitors of FIGS. 11-14. The foregoing embodiments can be applied in a private setting (i.e., only visible to the gamer) and/or a social network of gamers who share and present results via the AMS application or a social network such as FaceBook™ or other suitable social network platform.

In yet another embodiment, the AMS application can be adapted to compare a gamer's performance to another gamer's recorded performance. In a tournament setting, for example, the gamers' performance can be compared to each other based on the present gaming session or prior recorded sessions of the other gamer. In one embodiment, the AMS application can be adapted to present a GUI where it presents a list of gamers and recorded sessions from each gamer. The GUI can enable a user to select a particular gamer and a particular recorded gaming session of the selected gamer for comparison to a recorded (or live) gaming session of the user making the selection or another gamer of interest to the user (e.g., comparing the performance of two professional gamers).

It should be noted that gaming sessions recorded by the AMS application can be locally stored on a gamer's computing device (e.g., desktop computer or gaming console) or on a remote server managed by a service provider of the AMS application or by a service provider that provides "Cloud" storing services. Comparison results can similarly be stored on a gamer's local computing device or a remote server.

In yet another embodiment, the AMS application can be adapted to alert users when a particular gamer has achieved certain performance criteria established by another gamer. For instance, the AMS application can present a GUI to a gamer to identify performance criteria of interest (e.g., number of kill hits, average hit rate for a particular weapon, a particular ranking of a gamer for a particular gaming application, etc.). The identified performance criteria can be monitored by the AMS application for the selected gamer and when one or more criteria have been achieved by the monitored gamer, the AMS application can alert the interested user by suitable communication means such as email, short messaging system (SMS) text message, or a GUI of the AMS application when the interested user is engaging the AMS application.

In another embodiment, the AMS application can compare the performance of the gamers to a community rating localized to users of the gaming console 206, or all or a portion of on-line users which can span a large community of users of the gaming application. For example, although an average hit rate of 5% for a sniper rifle may seem low for gamer #1 in FIG. 11, when these statistics are compared to other members of a community (e.g., other professional players), the AMS application can determine from prior performance records of members of the community (retrieved from a local or remote database) that the user's performance is in fact above average. Similar community comparisons can be performed for the weapon type "machine gun" and "hand gun". The AMS application can also monitor and track statistics of other gaming applications which may have different weapon types. Similar statistics can be generated and compared to the performance of members of a community to which the gamer is associated.

In one embodiment, the statistical results shown in FIGS. 11-14 can be used to identify behavioral and/or skill patterns of a gamer. For instance, suppose a gamer appears to perform well as a sniper in one gaming application and bow and arrow marksman in a different gaming application. The AMS application can be adapted to detect these correlations to indicate a skill set of the gamer that may be consistent between different games. For example, a sniper and bowman have a similar trait that requires marksmanship, calm nerves, and knowing when to strike. This trait can be identified by the AMS application and can be used to identify other games in which the gamer may perform well. This trait can also be advertised to other gamers to promote teams.

The above-described methods can be adapted to operate in whole or in part in a gaming accessory, in an operating system of a computer, in a gaming console, in a gaming application that generates the video game, or any other suitable software application and/or device.

In an embodiment, the AMS application can be adapted to ignore or filter game action results not considered relevant by the gamer or analysts. For instance, the AMS application can be adapted to ignore (or filter) game action results relating to navigation of the avatar (e.g., turn around, jump, etc.). The AMS application can also be adapted to ignore (or filter) game action results relating to preparatory actions such as reloading a gun, switching between weapons, and so on. In another embodiment, the AMS application can be adapted to selectively monitor only particular game result actions such as misses, non-kill hits, kills, and life of the avatar. The AMS application can also be adapted to monitor gaming action results with or without temporal data associated with the stimuli and game action results.

In one embodiment, the AMS application can be adapted to track stimuli (or substitutions thereof) by submission order, and order of gaming action results supplied by the gaming application, and perform cataloguing thereof by the respective order of stimuli and gaming action results. The items can be catalogued by the AMS application with or without temporal data.

In one embodiment, the AMS application can be adapted to collect gaming action results for "all" or a substantial portion of stimuli (or substitutions thereof) transmitted to the gaming application. In this embodiment, the AMS application can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In one embodiment, the AMS application can be implemented as a distributed system (e.g., one or more servers executing one or more virtual machines) enabling multiples users to control aspects of the AMS application. For example, in a tournament setting, gaming analysts having access to the AMS application can request a replay of portions of the game to demonstrate exceptional plays versus missed plays at a JumboTron™ display. The gamers can access the AMS application to establish new substitute stimuli, perform calibrations on macros, or invoke or create additional gaming profiles. Portions of the AMS application can also be implemented by equipment of unaffiliated parties or service providers of gaming services.

In one embodiment, the AMS application can be adapted to substitute an accessory stimulus (or stimuli) for a macro comprising a combination of substitute stimuli, and track the macro when gaming action results are received from the gaming application rather than track each individual substitute stimulus of the macro. The AMS application can be adapted to monitor macros by tracking an order of stimuli (or substitutes) associated with the macro that are transmitted to the gaming application and by tracking an order of gaming action results received from the gaming application, which are associated with the macro. Alternatively, or in combination the AMS application can add a unique identifier to the substitute stimuli to identify the stimuli as being associated with the macro.

The AMS application can be adapted to catalogue the gaming action results associated with the macro in a manner that allows the gamer to identify a group of gaming action results as being associated with the macro. The AMS application can also be adapted to collect sufficient data to assess each individual gaming action result of the macro (e.g., temporal data, hits, misses, etc.). The presentation of catalogued macro data can be hierarchical. For example, the AMS application can present a particular macro by way of a high level GUI that indicates the macro caused a kill. The AMS application can be adapted to enable the gamer to select a different GUI that enables the user to visualize a gaming action result for each stimulus of the macro to determine how effective the macro was in performing the kill, and whether further adjustments of the macro might improve the gamer's performance.

In one embodiment, the AMS application can be adapted to present more or less competitive information than is shown in FIGS. 11-14. In one embodiment, for example, the AMS application can be adapted to present competitive information without the virtual peripherals. In one example, the AMS application can be adapted to present scrollable pages of competitive information with or without the virtual peripherals. In another illustration, the AMS application can be adapted to present competitive information without a viewing of the game or the gamer. Other variants of presenting competitive information or other data shown in FIGS. 11-14 are contemplated by the subject disclosure.

The foregoing embodiments are a subset of possible embodiments contemplated by the subject disclosure. Other suitable modifications can be applied to the subject disclosure.

FIG. 15 depicts an exemplary diagrammatic representation of a machine in the form of a computer system 1500 within which a set of instructions, when executed, may cause the machine to perform any one or more of the methods discussed above. One or more instances of the machine can operate as any of devices depicted in FIGS. 1-3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, or a solid state display. The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A gaming controller device comprising:
   a gaming controller body;
   a gaming controller cover;
   a sensor;
   a memory that stores instructions; and
   a processor coupled to the memory, wherein the processor, responsive to executing the instructions, performs operations comprising:
   detecting the cover of the device with respect to the body of the device;
   determining, via the sensor, whether the device is ready for use, wherein the device is determined to be ready for use in response to detecting removal of the cover from a first position proximate to a top side of the body and subsequent placement of the cover in a second position proximate to a bottom side of the body; and
   in accordance with the determining that the device is ready for use, performing further operations comprising:
      transmitting a signal to a computing device indicating that the device is ready for use;
      directing the computing device to perform an initializing procedure for a gaming engine executing on the computing device, wherein the initializing procedure comprises determining initial settings; and
      directing the computing device to perform a search procedure, wherein the search procedure comprises querying availability of another device for playing a game.

2. The device of claim 1, wherein the sensor comprises a switch that is actuated in accordance with the placement of the cover in the second position.

3. The device of claim 1, wherein removal of the cover from the first position without placement of the cover in the second position corresponds to a standby state.

4. The device of claim 1,
   wherein the first position corresponds to an OFF state of the device in which power is not supplied to components inside the body and control devices relating to the game are covered and accordingly not accessible to a user; and
   wherein the placement of the cover in the second position corresponds to the device entering a ready state where power is supplied to the components inside the body and the control devices are uncovered and accordingly accessible to the user.

5. The device of claim 2, wherein the switch comprises a first electrical contact at the cover and a second electrical contact at the bottom side of the body.

6. The device of claim 2, wherein the switch comprises a proximity sensor to sense proximity between the cover and the body.

7. The device of claim 6, wherein the switch comprises a magnetic switch or a capacitive switch.

8. The device of claim 1, wherein the initial settings comprise default settings for the gaming engine or a user profile accessible to the gaming engine.

9. The device of claim 1, wherein the cover comprises a grip to facilitate handling of the device when the cover is in the second position and the device accordingly is in a ready state.

10. A computer-readable storage device communicatively coupled to a gaming controller device, the computer-readable storage device comprising instructions, which responsive to being executed by a processor, cause the processor to perform operations comprising:
    detecting a gaming controller cover of the gaming controller device with respect to a body of the gaming controller device;
    determining, in response to detecting placement of the cover proximate to a bottom side of the body, that the gaming controller device is ready for use; and
    in accordance with the determining that the gaming controller device is ready for use, performing further operations comprising:
       transmitting a signal to a computing device that the gaming controller device is ready for use; and
       directing the computing device to perform an initializing procedure for a gaming engine executing on the computing device, wherein the initializing procedure comprises determining initial settings.

11. The computer-readable storage device of claim 10, wherein the operations further comprise directing the computing device to perform a search procedure, wherein the search procedure comprises querying availability of another device for playing a game.

12. The computer-readable storage device of claim 10, wherein the determining that the gaming controller device is ready for use further comprises detecting removal of the cover from a top side of the body.

13. The computer-readable storage device of claim 10, wherein the gaming controller device is determined to be ready for use in response to detecting proximity of the cover to the bottom side of the body by a proximity sensor.

14. The computer-readable storage device of claim 13, wherein the proximity sensor comprises a capacitive switch or a magnetic switch.

15. A method comprising:
    detecting, by a device comprising a processor, a gaming controller cover of a gaming controller device with respect to a body of the gaming controller device;
    determining, by the device, whether the gaming controller device is ready for use, wherein the gaming controller device is determined to be ready for use in response to detecting removal of the gaming controller cover from a top side of the body and subsequent placement of the gaming controller cover on a bottom side of the body; and
    in accordance with the determining that the gaming controller device is ready for use,
       transmitting, by the device, a signal to a computing device that the gaming controller device is ready for use; and
       directing, by the device, the computing device to perform an initializing procedure for a gaming engine executing on the computing device.

16. The method of claim 15, wherein the placement of the cover on the bottom side of the body actuates a switch comprising an electrical contact or a proximity sensor.

17. The method of claim 16, wherein the proximity sensor comprises a capacitive switch or a magnetic switch.

18. The method of claim 15, further comprising:
in accordance with the determining that the gaming controller device is ready to use, directing the computing device to perform a search procedure, wherein the search procedure comprises querying availability of another device for playing the game.

19. The method of claim 15, wherein the initializing procedure comprises determining initial settings for a game.

20. The method of claim 19, wherein the initial settings comprise default settings for the gaming engine or a user profile accessible to the gaming engine.

\* \* \* \* \*